United States Patent [19]

Whitney

[11] 4,089,489
[45] May 16, 1978

[54] BRAKING APPARATUS FOR A WEB TRANSPORT SYSTEM

[75] Inventor: James C. Whitney, Fairfield, Conn.

[73] Assignee: Dictaphone Corporation, Rye, N.Y.

[21] Appl. No.: 678,597

[22] Filed: Apr. 20, 1976

[51] Int. Cl.² .................. G03B 1/04; G11B 15/32
[52] U.S. Cl. ................................................ 242/204
[58] Field of Search ........................ 242/200–204, 242/206, 54 R, 55, 67.3, 199; 360/74–78

[56] References Cited

U.S. PATENT DOCUMENTS

| | | | |
|---|---|---|---|
| 3,037,088 | 5/1962 | Berger et al. | 360/74 |
| 3,652,030 | 3/1972 | Nakano | 242/201 |
| 3,705,699 | 12/1972 | Siller | 242/199 |
| 3,757,057 | 9/1973 | Fleming | 242/204 X |
| 3,809,336 | 5/1974 | Kollar et al. | 242/202 |
| 3,850,384 | 11/1974 | Priest | 242/201 |
| 3,869,100 | 3/1975 | Flippen, Jr. | 242/201 |

Primary Examiner—Leonard D. Christian
Attorney, Agent, or Firm—Arthur V. Smith

[57] ABSTRACT

Braking apparatus for a web transport system to move a web between rotary members wherein at least one motor is provided for moving the rotary members to drive the web. One of the rotary members is coupled to and drives a first mechanism; and another movable member is coupled to and drives a second mechanism which mechanisms exert retarding forces on the respective rotary members such that when the driving force from the motor is removed and the rotary members are no longer driven, the retarding forces exerted thereon act to brake the rotary members.

In an embodiment wherein the shoeless braking apparatus is used in a tape recording and/or playback device, one motor drives a take-up reel rotary member. In addition, a second motor may be provided to selectively drive the take-up reel rotary member in a "fast-forward" direction and to selectively drive the supply reel rotary member in a "rewind" direction. When the driving forces exerted by the respective motors are removed from the supply and take-up rotary members, the drag from the driven mechanisms coupled thereto is sufficient to brake the rotary members without the assistance of brake shoes. In one example, such driven mechanisms are indicators for providing indications of the amount of tape which has been transported and the relative position of the tape then being moved with respect to the total length of tape.

10 Claims, 4 Drawing Figures

BRAKING APPARATUS FOR A WEB TRANSPORT SYSTEM

BACKGROUND OF THE INVENTION

This invention relates to braking apparatus and, more particularly, to braking apparatus for a web transport system, for example a web transport for a tape recording and/or playback device.

In a typical web transport system, such as in a tape transport system for use in a recording and/or playback device, the web is driven between rotary members by driving one of the rotary members from a suitable source, such as a motor. When web movement is to be arrested, the driving motor usually is deenergized. In many instances, the transmission between the motor and the driven rotary member is such that when the motor is deenergized, the rotary member effectively is braked. However, the non-driven rotary member tends to continue to rotate, or freewheel, unless positive braking forces are exerted thereon. Typically, such braking forces are exerted by brake shoes.

A modification of the aforedescribed web transport system is found in tape recording/playback devices. In such devices, a first motor generally drives a take-up reel and capstan during recording and playback modes. In general, a second motor is provided to selectively drive the take-up reel in a fast-forward mode or to selectively drive a supply reel in a rewind mode. Suitable transmission couplings are provided so that only one of the supply and take-up reels is driven; and when the take-up reel is driven, these couplings mutually exclusively determine the speed. In a typical device, the capstan motor usually is continually energized, and the transmission coupling selectively applies this continuous rotary drive to the take-up reel. Heretofore, it has been necessary to rely upon brake shoes for braking both the supply and take-up reels when this rotary drive is removed. Also, in such devices, when the rewind/fast-forward motor is coupled to, for example, the supply reel, brake shoes must be used to brake the freewheeling take-up reel. Conversely, if the high speed motor is coupled to drive the take-up reel, brake shoes must be provided to brake the freewheeling supply reel.

Although such brake shoes heretofore have satisfactorily accomplished their intended purpose, it has been found that suitable control apparatus must be provided for selectively controlling these brake shoes. Typically, such control apparatus includes one or more solenoids to selectively energize the respective brake shoes into an operative braking condition, or a mechanical linkage. Solenoids or linkages require adequate power for their proper operation; and add to the bulk, complexity and cost of the web transport system and, thus, the recording/playback device. However, it has been thought heretofore that the respective rotary members cannot be effectively braked without brake shoes unless these members are driven by fixed gear assemblies. In general, such gear assemblies are not used because they require very high tolerances, and often cannot withstand the abrupt starting and stopping operations which attend the operation of web transport systems as used in recording/playback devices.

OBJECTS OF THE INVENTION

Therefore, it is an object of the present invention to provide improved braking apparatus for a web transport system which does not require the use of brake shoes.

Another object of this invention is to provide braking apparatus which can be used with the tape transport apparatus of a recording and/or playback device.

Yet another object of this invention is to provide improved braking apparatus which can be used in a recording and/or playback device, wherein the retarding forces exerted on the tape transport mechanism by the various operative components of the device are sufficient to brake the tape without the use of additional brake shoes or other braking devices.

Various other objects and advantages of this invention will become apparent from the ensuing detailed description, and the novel features will be particularly pointed out in the appended claims.

SUMMARY OF THE INVENTION

In accordance with this invention, braking apparatus is provided for a web transport system, such as a tape drive system which can be used in a recording and/or playback device, wherein at least one motor drives rotary members for moving the web therebetween; a first movable mechanism is coupled to one of the rotary members and is driven when that rotary member rotates; and a second movable mechanism is coupled to another rotary member and is driven when that other rotary member rotates; the first and second movable mechanisms exerting retarding forces on the respective rotary members such that when the motor drive force is removed, the retarding forces brake the rotary members to arrest the movement of the web.

It is one advantageous feature of this invention which permits the braking apparatus to be used in a tape recording and/or playback device without requiring the use of brake shoes or other braking devices to halt the movement of tape when a record or playback or fast-forward or rewind operation is terminated.

BRIEF DESCRIPTION OF THE DRAWINGS

The following detailed description, given by way of example, will best be understood in conjunction with the accompanying drawings in which.

DETAILED DESCRIPTION OF A CERTAIN ONE OF THE PREFERRED EMBODIMENTS

Figure 1:
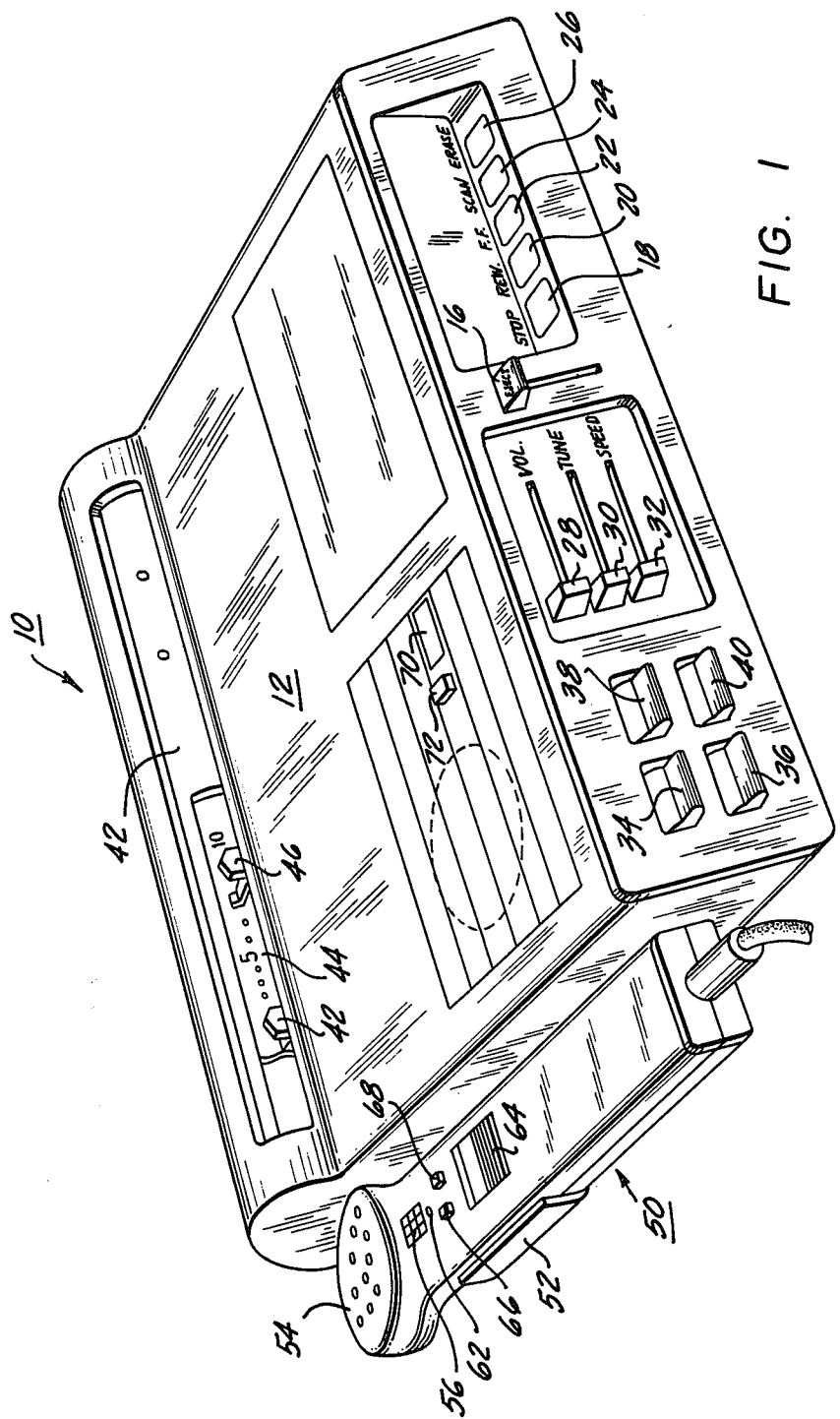
FIG. 1 is a perspective view of a recording/playback device in which the present invention finds ready application.

Referring now to the drawings, wherein like reference numerals are used throughout, the present invention will be described in the environment of a web transport system, such as a tape transport system, which can be used in a magnetic tape recording and/or playback device. One embodiment of such a device is a dictation apparatus of a type shown, generally, in FIG. 1. Dictation apparatus 10 includes a housing 12 for a chassis (not shown) upon which the various mechanical elements and electronic circuitry are supported. FIG. 1 also shows various operator-actuated elements, or control switching devices, to effect dictation and/or playback operations. The record medium for the illustrated dictation apparatus 10 is magnetic tape of the type which is self-contained in a cassette housing. Such a magnetic tape cassette is conventional and includes a supply reel and a take-up reel. The cassette housing is provided with various apertures whereby reel drive spindles can drivingly engage the supply and take-up reels, and whereby a record/playback transducer, or head, can be inserted into contact with the tape. As is conventional, additional apertures are provided to receive an erase head and a pressure roller, the latter cooperating with a capstan for moving the tape past the various heads. In order to accommodate such a tape cassette, dictation apparatus 10 is provided with a cassette holder compartment 14. Although not shown herein in detail, the cassette holder compartment is provided with a support platform for the cassette housing, various guide mechanisms for the cassette housing and, preferably, a door which is closed to shield the cassette and the machine elements during operation.

Typical of the operator-controlled elements is an eject control 16 which, when actuated, serves to lift the door to the cassette holder compartment and, if a cassette is on the support platform, to eject the cassette for removal. A series of control elements or switches, such as push-buttons or touch-sensitive devices, is provided for an operator to selectively control various operations. For example, a stop control 18 is provided to terminate the operation of dictation apparatus 10, to brake the movement of tape and to dispose the machine in a quiescent mode.

The series of control elements also includes a rewind control 29 for rewinding the tape from its take-up reel within the cassette housing to its supply reel, and a fast-forward control 22 to rapidly move the tape from its supply reel to its take-up reel. A scan control 24 is provided for rapidly moving the tape in its forward direction while electronically scanning the moving tape for the presence of predetermined control signals thereon. As described in greater detail in copending application Ser. No. 678,697, filed Apr. 20, 1976, these control signals represent various instructions which are useful in guiding a transcriptionist during a transcribe operation. Hence, when actuated, scan control 24 causes appropriate control components to detect and indicate the relative locations of such control signals. Also shown is an erase control 26 for erasing information which previously had been recorded on the magnetic tape.

Another series of operator-actuated control elements is provided to enable an operator to selectively control the audio characteristics of reproduced information. To this effect, a volume control 28, a tone control 30 and a tape-speed control 32 are provided to perform their indicated functions.

Yet another series of operator-actuated control elements is provided, including an on/off switch 34, a speaker control switch 36 and a conference/dictate switch 38. The illustrated dictation apparatus 10 is provided with a loudspeaker and, additionally, the microphone assembly 50, to be described, which is used with this dictation apparatus also is provided with a loudspeaker. Accordingly, the speaker control switch 36 permits an operator to selectively actuate the loudspeaker of the dictation machine or the loudspeaker of the microphone assembly for the reproduction of sound, as desired. The conference/dictate control switch 38 is provided to selectively enable an operator of dictation apparatus 10 to record a conference. In the latter mode, the amplification gain of the recording electronic circuitry is increased.

An optional telephone control switch 40 is provided to selectively enable an operator to use dictation apparatus 10 to record information directly from a telephone line.

Indicator lights 42, 42A are provided at the rear of dictation apparatus 10 for apprising an operator of the condition of the machine. Positioned adjacent the indicators 42, 42A is a slide index 44 including a scale and a movable slide lever 48 attached to the scale. Slide lever 46 moves in synchronism with the movement of the cassette tape so as to indicate to the operator his present position in respect to the full length of the tape and moves relative to the slide index 44 to indicate tape position.

A microphone assembly 50 is electrically connected to the control electronics included in dictation apparatus 10. For convenience, microphone assembly 50 is supported on a microphone support bracket 52 which may be coupled to the machine housing 12. Microphone assembly 50 includes a sound transducer 56 for converting audio information into corresponding electrical signals, and a loudspeaker 54, described above. In addition, various operator-controlled actuating elements 58, 60, 62 and 64 are provided to enable an operator to control a dictation operation merely be the selective operation of the indicated elements.

These elements include a dictate control slide switch 64 which controls various machine functions. In one position switch 64 places the apparatus in a record mode; in another position switch 64 places the apparatus in a rewind mode; in still another position switch 64 places the apparatus in a playback mode; and in yet another position switch 64 places the apparatus in a neutral or stop mode. Switch 60 places the apparatus in a fast forward tape mode and switch 58, when actuated, places predetermined control signals on the tape indicating that succeeding information is intended to be an instruction, or that the end of a selected piece of dictation has been reached. It is these control signals which are detected in response to the actuation of the scan control 24. Element 62 is a light which indicates the operating mode in which dictation apparatus 10 is conditioned.

As shown in FIG. 1, dictation apparatus 10 is provided with a tape footage counter 70, which may be a conventional digital counter to indicate the amount of tape which has been transported. A reset control is adapted to reset the count displayed by counter 70 to a reference, or zero, indication.

The function of each of the aforementioned operator-control elements is self-evident. Accordingly further description thereof is not provided.

Figure 2:
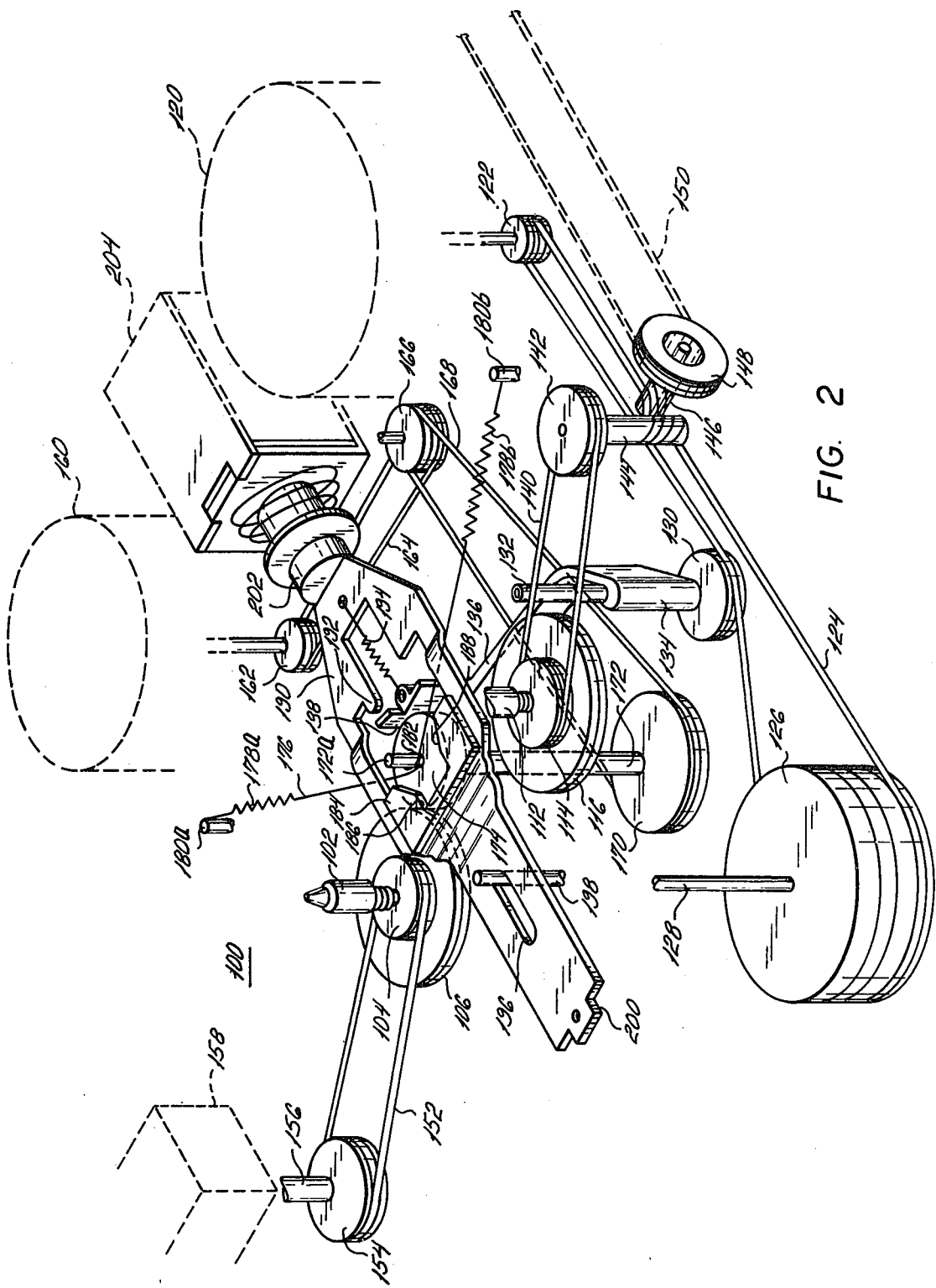
FIG. 2 is a perspective view of the tape transport system which can be used in the recording/playback device of FIG. 1 and which includes the braking apparatus of the present invention.
Figure 3:
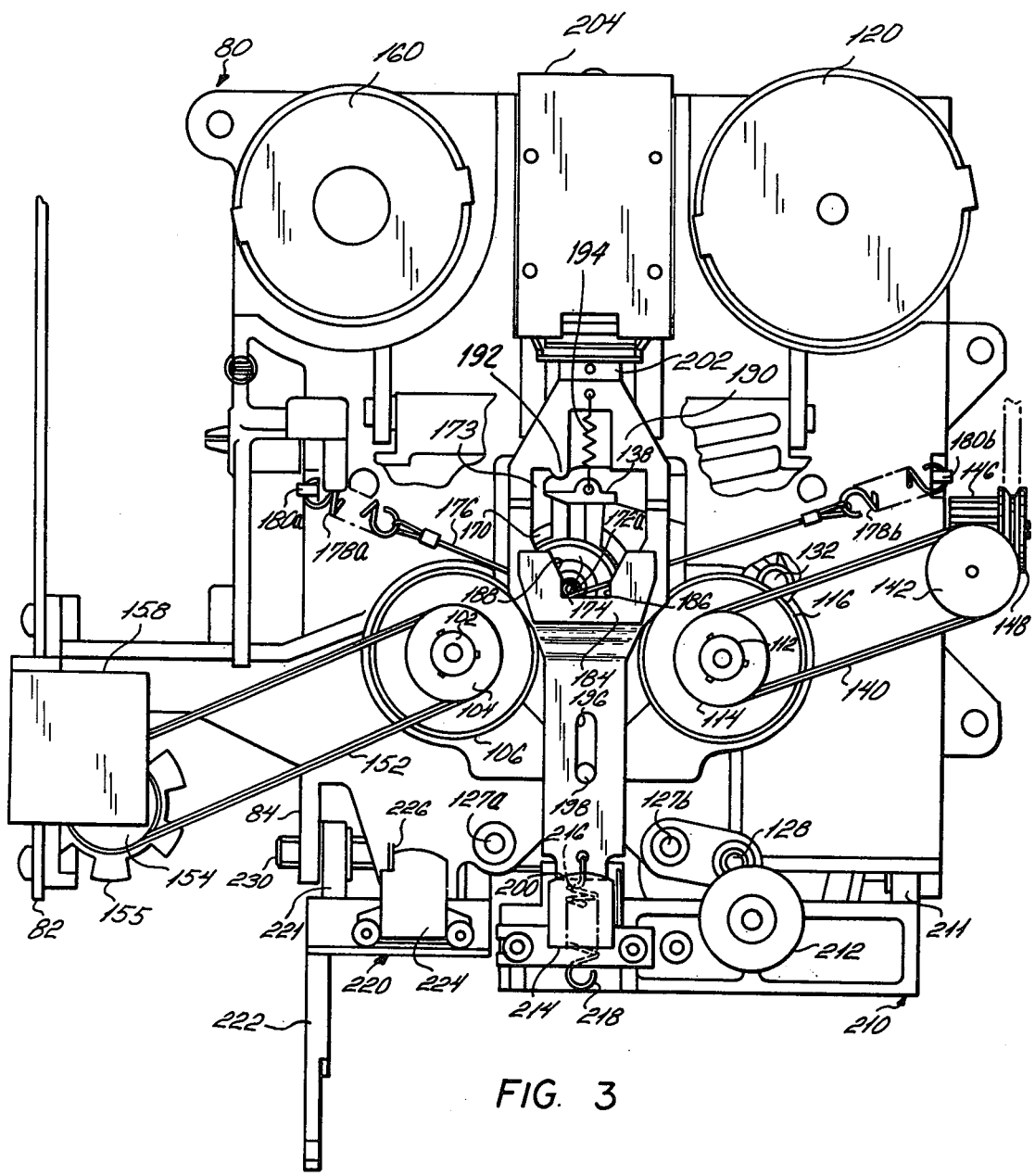
FIG. 3 is a top plan view of the tape transport system shown in FIG. 2 and includes additional elements which are used in the machine shown in FIG. 1.
Figure 4:
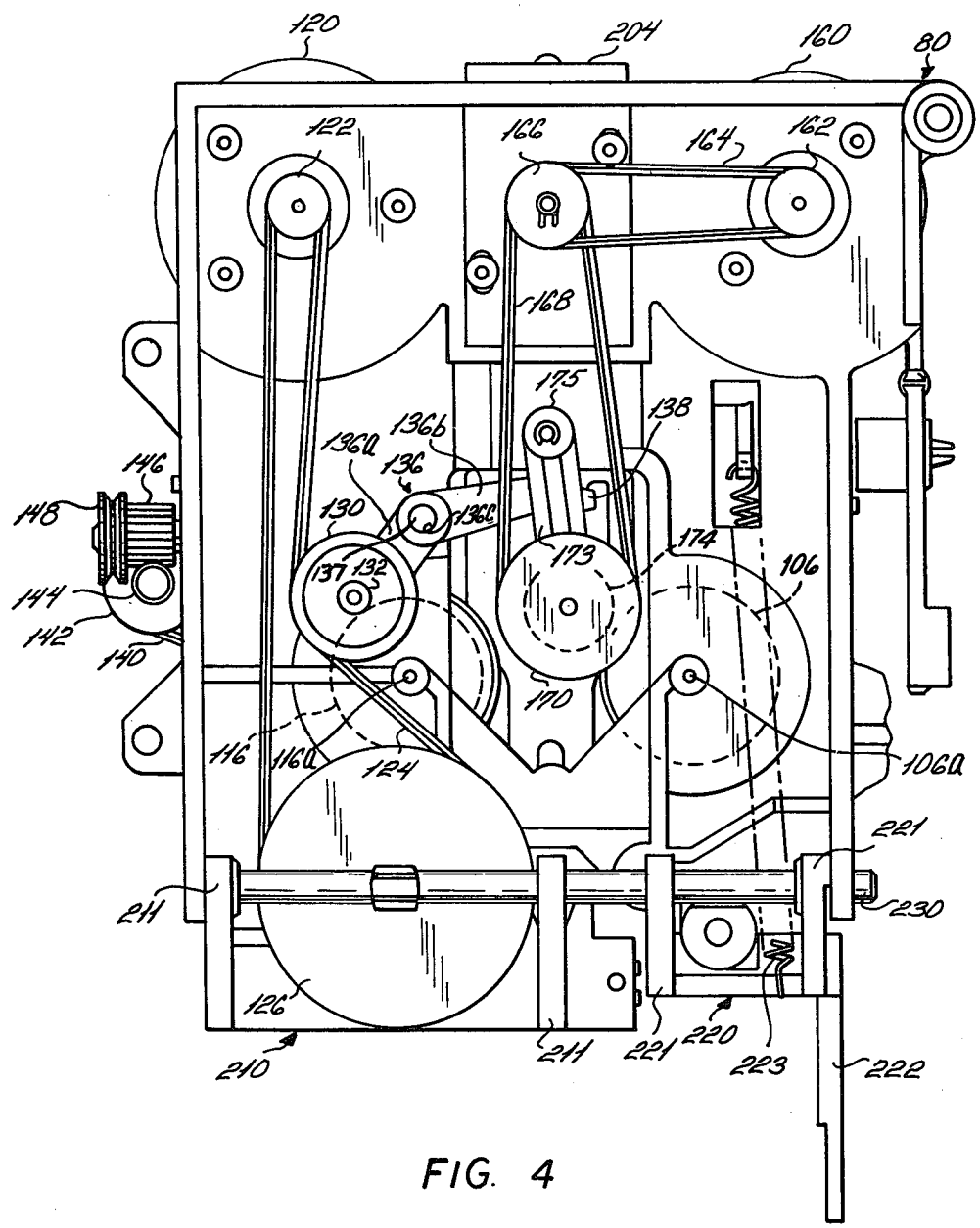
FIG. 4 is a bottom plan view of the apparatus shown in FIG. 3.

Referring now to FIGS. 2, 3 and 4, there is illustrated the drive mechanism which can be used in the tape transport system included in the dictation apparatus shown in FIG. 1. This drive mechanism is described in greater detail in copending application Ser. No. 678,704, filed Apr. 20, 1976. Accordingly, the following description is directed to the braking apparatus which is used to brake the drive mechanism. In order to facilitate a ready understanding of the braking apparatus and drive mechanism, a preferred application thereof in a tape transport assembly will be described. However the present invention need not be limited solely to such an application.

The tape transport assembly 100, best shown in perspective in FIG. 2, includes a supply reel spindle 102, a take-up reel spindle 112 and a capstan 128. As is conventional, supply reel spindle 102 and take-up reel spindle 112 are received in supply and take-up reel hubs, respectively, in a tape cassette housing. A supply reel pulley 104 and a supply reel disc member 106 are coupled to supply reel spindle 102 so that supply reel spindle 102, pulley 104 and disc 106 rotate together. The peripheral surface, or rim, of supply reel disc 106 is frictionally driven and is provided with a suitable material, such as rubber, or the like. As shown in the bottom view of FIG. 4, supply reel disc 106 is, in turn, free to rotate about a fixed shaft 106a which is secured to the chassis 80 (FIG. 4). In like manner, take-up reel spindle 112 is coupled to a take-up reel pulley 114 and a reel disc 116, the latter being supported by a suitable shaft 116a (FIG. 4). The peripheral surface, or rim of the reel disc 116 is also provided with a suitable material to permit the disc to be frictionally driven.

In the illustrated embodiment, two separate motors 120 and 160 are provided. Motor 120 operates continuously when power is supplied to the dictation apparatus. A pulley 122, coupled to motor 120, cooperates with a drive belt 124 entrained thereabout to drive the capstan flywheel 126. Thus capstan 128 is continuously driven by motor 120. Belt 124 is played about capstan flywheel 126 and in driving contact with a slip-clutch pulley 130 secured to a drive shaft 132 journalled for rotation in a support sleeve 134. As shown in FIGS. 2 and 4, support sleeve 134 is at one end of a pivoting crank arm 136. Preferably, support sleeve 134 and pivoting crank arm 136 are of unitary construction. Of course, if desired, these components may be constructed separately and coupled together by any suitable means. Pivoting crank arm 136 has leg segments 136a and 136b (FIG. 4) disposed at an angle to each other. At the juncture of legs 136a and 136b an access bore 136c is provided to accommodate a pivot shaft 137. A pivoting crank arm actuator 138 is provided at the other end of leg 136b.

Pivot shaft 137, which may be formed on the chassis, is positioned so that when the pivoting crank arm 136 pivots thereabout, drive shaft 132 is urged into or out of contact with the rim or take-up reel disc 116. More particularly, and as viewed in FIG. 2, when a force is applied to the pivoting crank arm actuator 138 so as to pivot the pivoting crank arm 136 counterclockwise about its pivot shaft 137, drive shaft 132 is urged away from the rim of take-up reel disc 116. Conversely, when a force is applied to pivoting crank arm actuator 138 to pivot pivoting crank arm 136 in the clockwise direction (FIG. 2), drive shaft 132 is urged into contact with the rim of disc 116. Since pulley 130 and drive shaft 132 are continuously rotated by motor 120, contact between drive shaft 132 and take-up disc 116 applies a driving force to reel disc 116. As disc 116 is so driven, tape is moved from the supply reel to the take-up reel. Slip-clutch pulley 130 may be overdriven by motor 120 to assure proper tension in the tape which is transported.

Take-up reel pulley 114 is coupled to another pulley 142 by a drive belt 140. A worm gear 144 is secured to and rotates with pulley 142 and is in meshing engagement with a gear 146. This latter gear is coupled to a slide indicator drive pulley 148 which, in turn, is coupled to slide indicating mechanism (not shown) by a drive belt 150. The slide indicating mechanism includes a slidable carriage which is advanced by a lead screw rotated as drive belt 150 is driven. Thus, as the take-up reel rotates, slide indicator drive pulley 148 is driven to impart a corresponding movement of the slide indicator mechanism. Movement of the slide indicator is observed by the operator as movable slide lever 46 (FIG. 1) is displaced along slide index 44, and indicates the relative portion of the tape which then is moving between the supply and take-up reels. As noted above, this apprises the operator of the present position along the tape in respect to the full length of the tape.

Supply reel pulley 104 is coupled by a drive belt 152 to a pulley 154 which, in turn, is connected by a drive shaft 156 to a digital counter 158. As shown in FIG. 3, a chopper wheel 155 is secured to and rotates with drive shaft 156. Thus, rotation of supply reel disc 106 drives pulley 154 and shaft 156 resulting in a concomitant change in the count indicated by counter 158. Hence, a counter mechanism 158 is used as the tape footage counter 70 (FIG. 1). Chopper wheel 155, which rotates with pulley 154, includes spaced radically extending segments which periodically interrupt a light beam. In the event there is a break in the tape in the cassette, the supply reel will cease rotating, thus chopper wheel 155 will not rotate and the light beam will not be interrupted. This condition is sensed by suitable control circuitry (not shown) and a correspondng indication is indicated by control light 42 (FIG. 1). As depicted in FIG. 3, counter mechanism 158 is mounted on a suitable frame member 82 of the chassis 80.

In the illustrated apparatus, the supply and take-up reel discs are bi-directionally driven at a relatively high speed by a bi-directional motor 160 which is coupled to a drive roll pulley 170 coupled to a drive roll 174 by a drive shaft 172 whose free end 172a is "captured" by a string member 176 looped thereabout. The ends of string 176 are secured by spring members 178a and 178b to suitable anchors 180a and 180b, respectively, on the chassis 80. The intermediate portion 182 of string 176 is deployed about free end 172a of drive shaft 172. The assembly formed of drive roll pulley 170, drive shaft 172 and drive roll 174 "walks" along string member 176 so as to be laterally displaced between supply and take-up reel discs 106, 116 depending upon the direction in which drive roll pulley 170 is rotated by motor 160. A support link 173 (FIG. 4) is provided to support this assembly in a proper upright position as seen in FIG. 2. The manner in which drive roll 174 is driven to selectively rotate the supply and take-up reel discs is described in greater detail in copending application Ser. No. 678,704, filed Apr. 20, 1976.

A mechanical "stop" comprising a yoke member 184 secured to a link member 190 which, in turn, is longitudinally moved by a solenoid 204, is provided to remove the drive roll 174 from contact with either supply reel disc 106 or take-up reel disc 116 during certain machine operations. For this purpose, yoke member 184 is provided with a cut-out 186 from which extend the outwardly tapering legs of a bifurcated end portion 188. Accordingly, when yoke 184 is moved in a first direction, cut-out 186 contacts drive shaft 172 to disengage drive roll 174 from contact with either reel disc (regardless of whether the drive roll is rotating at that time). Conversely, when yoke 184 is moved in an opposite direction, the legs of bifurcated end portion 188 are effectively clear of drive shaft 172 thus removing any constraint on lateral displacement of drive roll 174.

Link member 190 is coupled at one end to armature 202 of solenoid 204, and at its other end 200 to a pivotable head support bridge member 210 (FIG. 3). Link member 190 also is provided with an abutment 192 to contact the aforedescribed pivoting crank arm actuator 138 and with a coupling spring 194 for resiliently coupling actuator 138 to link member 190.

As shown in FIGS. 3 and 4, bridge support member 210 includes legs 211 pivotally mounted on a pivot rod 230 and provides a support for a pressure roller 212 and a record/playback head 214. As described in greater detail in copending application Ser. No. 678,596, filed Apr. 20, 1976, bridge member 210 pivots to place pressure roller 212 and head 214 in proper alignment with the openings provided in the tape cassette which is supported on the cassette holder of the apparatus. Since legs 211 extend downwardly from bridge member 210, its pivoting movement is in a plane normal to the direction of movement of the magnetic tape between the supply and take-up reels. Such pivoting movement is determined by free end 200 of link member 190 which moves bridge member 210 and, thus, pressure roller 212 and head 214 away from the tape cassette when solenoid 204 is de-energized. Coupling spring 216 (FIG. 3) between link member 190 and bridge member 210 pulls the bridge member toward the tape cassette when solenoid 204 is energized.

Although bridge member 210 can be utilized to support an erase head as well as record/playback head 214, in a preferred embodiment of the apparatus an additional bridge member 220 is provided to support an erase head 224. Bridge member 220 has legs 221 pivotally mounted on pivot rod 230, a spring 223 to bias the bridge member toward the tape cassette, and an eject lever 222 (terminating in eject control 16) to enable an operator to pivot bridge member 220 and, thus, erase head 224, away from the tape cassette to facilitate removal of the tape cassette from its holder.

The operation of the braking apparatus now will be described in the environment of the illustrated tape recording and/or playback apparatus. Initially, a tape cassette is placed on the cassette holder, the holder is placed in its operative position, and the apparatus placed into a record operation. Accordingly, solenoid 204 is energized and armature 202 is retracted with link member 190. Bridge member 210 is in position toward the tape cassette and cut-out 186 of yoke member 184 is positioned to constrain the lateral displacement of drive shaft 172 and drive roll 174. Hence, motor 120 drives capstan 128 which cooperates with pinch roller 212 to move tape from the supply reel past the erase and record/playback heads. Motor 120 also drives take-up reel drive shaft 132 rotating take-up reel disc 116 so that tape is wound thereon. Suitable electronic circuitry (not shown) operates to carry out a recording operation as tape is advanced past the record/playback head. The rotation of take-up reel support member 116 drives pulley 142 which, in turn, drives indicator drive pulley 148 to move the slide indicator mechanism. Hence, as the recording operation proceeds, the operator is apprised of the relative portion of tape which then is being processed. Also, as tape is payed out from the supply reel, the rotation of supply reel disc 106 drives pulley 154 which, in turn, drives counter 158.

To stop the recording operation an appropriate control element is actuated. Solenoid 204 is de-energized as is the recording circuitry. Consequently, solenoid armature 202 moves to its fully extended position, whereupon end 200 of link member 190 pivots bridge 210 away from the tape cassette, and abutment 192 pivots crank arm 136 in the clockwise (FIGS. 2 and 3) direction. This pivoting movement pivots pinch roller 212 away from capstan 128 and pivots drive shaft 132 away from take-up reel disc 116 to remove all positive tape drive. Because of the drag, or retarding force, exerted on supply reel disc 106 by pulley 154 and counter 158, supply reel disc 106 is not able to continue to rotate, and is braked to a stop. This, of course, brakes the supply reel. Similarly, because of the drag, or retarding force, exerted on take-up reel disc 116 by pulley 142, slide indicator drive pulley 148 and the slide indicator mechanism (not shown) driven by drive belt 150, the take-up reel disc is not able to continue to rotate, and is braked to a stop. Hence, the take-up reel is braked. Thus, it is seen that the retarding forces exerted on the supply and take-up reels serve to brake these reels when the positive tape drive (e.g. from motor 120) is removed, whereby tape movement is arrested, without the use of brake shoes.

It is evident that the aforedescribed termination of a recording operation with its attendant braking of the tape, is identical to the termination of a playback operation, except for the particular energization and de-energization of the recording and playback circuitry (not shown).

If the apparatus is in a mode where relatively high speed movement of the tape between the supply and take-up reels (as in fast-forward or rewind operations) is in progress, solenoid 204 is in a de-energized state with armature 202 in its fully extended position. As just described, drive shaft 132 is away from take-up reel disc 116 and bridge member 210 is away from the tape cassette. However, motor 160 is operating to rotate either in the tape-forward or tape-rewind direction. Consequently, drive shaft 172 is correspondingly rotated. Since cut-out 186 of yoke 184 has been moved away from the drive shaft (by the movement of the link member 190 responsive to extension of armature 202), drive shaft 172 is free to "walk" along string member 176. If motor 160 is rotating in the tape-forward direction, then drive shaft 172 is displaced toward take-up reel disc 116 until drive roll 174 contacts and drives this disc in a fast-forward mode. Conversely, if motor 160 rotates in the tape-rewind direction, then drive shaft 172 is displaced toward supply reel disc 106 until drive roll 174 contacts and drives this disc in a rewind mode. Therefore, tape is rapidly wound onto the take-up reel or rewound onto the supply reel, depending upon the direction motor 160 is driven, with a concurrent indication provided by the movement of the slide indicator (not shown) and a change in counter 158.

When the fast-forward or rewind movement of the tape is to be arrested by stopping, a suitable operator-controlled element is actuated. Solenoid 204 is maintained in its deenergized state, drive shaft 132 remains spaced away from take-up reel disc 116, bridge member 210 remains spaced away from the tape cassette and motor 160 is de-energized. Since drive roll 174 remains in contact with disc 106 or 116 the tape cannot freely wind and is brought to rest as motor 160 comes to rest. Thus the tape is always under positive control. In addition, the aforedescribed drag, or controlled retarding forces, the drag exerted on supply reel disc 106 by pulley 154 and counter 158, and exerted on take-up reel disc 116 by pulley 142, slide indicator drive pulley 148 and the slide indicator mechanism also assist in braking these respective reel discs to a stop.

The apparatus now is in condition for a subsequent operation. If another fast-forward or rewind operation is to be performed, motor 160 is suitably energized once again. If a record or playback operation is to be performed, motor 160 remains de-energized and solenoid 204 is energized. Energization of solenoid 204 moves yoke 184 so that its cut-out 186 abuts against drive shaft 172 to move drive roll 174 away from the supply reel and take-up reel discs. As link member 190 moves responsive to movement of solenoid armature 202 drive shaft 132 and bridge member 210 pivot toward the take-up reel disc and tape cassette, respectively, as described above.

While the present invention has been particularly shown and described with reference to use as braking apparatus in a tape transport system, it should be readily apparent that this invention finds broad application as braking apparatus for web driving mechanisms in general. An advantageous feature of this braking apparatus is the omission of brake shoes and associated control devices which have been required heretofore. Furthermore, it is apparent that one of ordinary skill in the art can make various changes and modifications in the form and details of the apparatus described herein without departing from the spirit and scope of the invention. Accordingly, it is intended that the appended claims be interpreted as including all such changes and modifications.

What is claimed is:

1. Braking apparatus for a web transport system of the type wherein a web is moved between rotatable members, comprising:
   a motor for driving said rotatable members to thereby drive said web therebetween;
   drive coupling means for selectively coupling said motor to as least one of said rotatable members to drive same;
   first movable means separate from one of said rotatable members;
   first transmission means for coupling said first movable means with said one rotatable member to drive said first movable means;
   second movable means separate from another of said rotatable members; and
   second transmission means for coupling said second movable means with said another rotatable member to drive said second movable means;
   said first and second movable means exerting retarding forces on said rotatable members such that when said motor does not drive said rotatable members, said retarding forces brake said rotatable members and arrest the movement of said web.

2. Braking apparatus as defined in claim 1 wherein said drive coupling means comprises a drive shaft driven by said motor and selectively pivotable from a first position in contact with a rim portion of one of said rotatable members to apply a driving force thereto and thereby rotate said one rotatable member, to a second position removed from contact with said rim portion; and means for selectively pivoting said drive shaft.

3. Braking apparatus as defined in claim 1 wherein said drive coupling means comprises roll means driven by said motor and selectively movable between a first position in contact with the rim portion of one of said rotatable members to a second position in contact with the rim portion of the other of said rotatable members thereby to apply a driving force thereto and rotate the said rotatable member contacted by said roll means; and means for removing the driving force imparted by said roll means to said one or the other of said rotatable members.

4. Braking apparatus as defined in claim 1 wherein each of said first and second movable means comprises a pulley member, a drive shaft connected to said pulley member for driving further means when an associated rotatable member is driven, and a drive belt for coupling said pulley member to its associated rotatable member.

5. In a tape recording and/or playback apparatus having supply and take-up reel disc members for supporting and rotating supply and take-up reels, respectively, for moving tape therebetween at a relatively slow speed in at least one direction and at a higher speed in said one and opposite directions, brake apparatus comprising:
   at least one motor for driving said reel disc members;
   coupling means for coupling said at least one motor to said take-up reel disc member;
   counter means for providing an indication of the length of tape moved between said supply and take-up reels;
   first transmission means coupled between said counter means and said supply reel disc member and driven thereby when said supply reel disc member is driven to drive said counter means;
   indicator means for providing an indication of the relative portion of said tape which then is moving between said supply and take-up reels; and
   second transmission means coupled between said indicator means and said take-up reel disc member and driven thereby when said take-up reel disc member is driven to drive said indicator means;
   said counter means, indicator means and respective transmission means exerting retarding forces on said reel disc members such that when said reel disc members are not driven by said motor, said retarding forces brake said reel disc members and arrest the movement of tape.

6. Brake apparatus as defined in claim 5 wherein each of said first and second transmission means comprises a drive belt and a pulley member coupled to an associated reel disc member by said drive belt for driving said respective counter means and indicator means in response to the rotation of said associated reel disc member.

7. In a tape recording and/or playback apparatus having supply and take-up reel disc members for supporting and rotating supply and take-up reels, respectively, for moving tape therebetween at a relatively slow speed in at least one direction and at a higher speed in said one and opposite directions, brake apparatus comprising:
   at least one motor for driving said reel disc members, said one motor being a relatively slow speed motor;
   coupling means comprising a drive shaft pivotable into and out of contact with the rim of said take-up reel disc member for selectively driving same, and power transfer means for transferring motive power from said slow speed motor to said drive shaft; whereby driving force is removed from said take-up reel disc member when said drive shaft is pivoted away therefrom; a first drive belt,
   a first pulley member coupled to said supply reel disc member by said first drive belt for driving first means in response to the rotation of said supply reel disc member; and a second drive belt a second pulley member coupled to said take-up reel disc member by said second drive belt for driving second means in response to the rotation of said take-up reel disc member;

said coupled pulley members and said first and second means exerting retarding forces on said reel disc members such that when said reel disc members are not driven, said retarding forces brake said reel disc members and arrest the movement of tape.

8. Brake apparatus as defined in claim 7, further comprising a relatively high speed motor; and wherein said coupling means further comprises a drive roll coupled to said high speed motor and selectively positionable to contact the rim of said supply reel disc member and the rim of said take-up reel disc member for selectively driving said supply reel disc member in one direction and said take-up reel disc member in the opposite direction, and control means for positioning said drive roll out of contact with both said reel disc members.

9. Brake apparatus as defined in claim 8 wherein said first means comprises counter means driven by said first pulley member for providing an indication of the length of tape moved between said supply and take-up reels.

10. Brake apparatus as defined in claim 9 wherein said second means comprises an index and an indicating member driven by said second pulley member to move along said index for providing an indication of the relative portion of said tape which then is moving between said supply and take-up reels.

* * * * *